US008896258B2

(12) United States Patent
Abel et al.

(10) Patent No.: US 8,896,258 B2
(45) Date of Patent: Nov. 25, 2014

(54) METHOD AND DEVICE FOR STARTING AN ELECTRIC MOTOR

(75) Inventors: Falko Abel, Aufhausen (DE); Eberhard Weidner, Nürnberg (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 183 days.

(21) Appl. No.: 13/702,589

(22) PCT Filed: May 31, 2011

(86) PCT No.: PCT/EP2011/058967
§ 371 (c)(1),
(2), (4) Date: Dec. 7, 2012

(87) PCT Pub. No.: WO2011/157553
PCT Pub. Date: Dec. 22, 2011

(65) Prior Publication Data
US 2013/0076279 A1    Mar. 28, 2013

(30) Foreign Application Priority Data

Jun. 17, 2010 (DE) .......................... 10 2010 030 239

(51) Int. Cl.
*H02P 6/00* (2006.01)
*H02P 1/40* (2006.01)
*H02P 6/20* (2006.01)

(52) U.S. Cl.
CPC . *H02P 1/40* (2013.01); *H02P 6/205* (2013.01)
USPC .................. 318/721; 318/400.14; 318/400.15; 318/280; 318/799

(58) Field of Classification Search
USPC ............. 318/400.01, 400.07, 400.09, 400.11, 318/400.14, 400.15, 701, 721, 727, 779, 318/799, 266, 280, 286, 362, 375, 376, 430, 318/432, 433, 434, 437, 560, 599, 652, 661, 318/801, 811; 388/800, 804, 819, 836, 930, 388/932
See application file for complete search history.

(56) References Cited

U.S. PATENT DOCUMENTS 4,565,957 A    1/1986 Gary et al.
5,019,756 A    5/1991 Schwarz
(Continued)

FOREIGN PATENT DOCUMENTS

DE    4122109 A1    1/1993
RU    2096906 C1    11/1997
(Continued)

OTHER PUBLICATIONS

International Search Report PCT/EP2011/058967 dated Apr. 17, 2012.
Report of Examination DE 10 2010 030 239.2 dated Aug. 1, 2011.
Granting Decision RU 2012154346 dated Jul. 18, 2014.

*Primary Examiner* — Antony M Paul
(74) *Attorney, Agent, or Firm* — James E. Howard; Andre Pallapies (57) ABSTRACT

A method for starting an electric motor having a rotor, comprising the following steps:—driving the rotor with a first torque in a first rotational direction, wherein a maximum value of the first torque is not higher than a maximum countertorque acting counter to the rotation of the rotor, so that the rotor comes to a standstill in a first stationary position;—driving the rotor starting from the first stationary position in a second rotational direction that is counter to the first rotational direction until the rotor comes to a standstill in a predefined second stationary position; and—starting from the rotor in the first rotational direction starting from the second stationary position.

21 Claims, 5 Drawing Sheets

(56) References Cited

U.S. PATENT DOCUMENTS

| | | | |
|---|---|---|---|
| 5,225,759 A | 7/1993 | Endo et al. | |
| 6,078,152 A * | 6/2000 | Dieterle et al. | 318/264 |
| 6,346,785 B1 | 2/2002 | Dainez et al. | |
| 6,452,359 B1 | 9/2002 | Schwarz et al. | |
| 2005/0174104 A1 | 8/2005 | Kranitzky et al. | |
| 2005/0253545 A1 * | 11/2005 | Dornhof | 318/434 |
| 2007/0001635 A1 | 1/2007 | Ho | |

FOREIGN PATENT DOCUMENTS

| | | |
|---|---|---|
| RU | 2222862 C2 | 1/2004 |
| RU | 52451 U1 | 3/2006 |
| SU | 1317630 A1 | 6/1987 |

* cited by examiner

METHOD AND DEVICE FOR STARTING AN ELECTRIC MOTOR

BACKGROUND OF THE INVENTION

The present invention relates to a method and a device for starting an electric motor.

Brushless direct current motors (also referred to as BLDC motors) are used, for example, as compressor drives in refrigerators. Such electric motors have phase windings, and a rotor which incorporates a permanent magnet. When the phase windings have current flowing through them, they generate a magnetic field which exercises a torque on the permanent magnets and thereby sets the rotor in motion. By actuating the various phase windings in turn, a rotating magnetic field is produced in the motor, which thereby drives the rotor.

Many drives, such as for example compressor drives in refrigerators, have a non-uniform load profile, which means that the load which they drive varies over a complete rotation of the motor, whereby the maximum torque which the motor must apply can be a multiple of the mean torque. When starting up the motor it is therefore advantageous initially to bring the rotor to a clearly defined position, so that the rotor will have already turned through the largest possible angle and have been accelerated to the greatest possible torque before the maximum torque load arises.

One possibility for positioning the rotor is to apply a defined constant current to the phase windings of the motor by actuating it with a particular switch setting, that is by setting it to a particular electrical position. The defined current results in a particular magnetic field, to which the rotor orientates itself with its permanent magnet. However, there is a problem with this approach in that, for motors with more than one pair of poles, the precise mechanical position is not known. Thus, in the case of a 6-pole motor, such as is often used for refrigerator compressors, a particular electrical position corresponds to three different mechanical positions, each of which is offset relative to the others by a rotational angle of 120°. Depending on the starting position, the rotor then adopts the mechanical position which lies closest to this starting position. However, this leads to the motor only being started from the optimal starting position at one of the three possible mechanical positions, whereas at the two other mechanical positions the angle of rotation up to the maximum load is smaller. In this latter case it can happen that when the motor reaches the maximum load it cannot yet apply the necessary torque to overcome the load, and thus stalls and the start-up fails. It may then be necessary to make several start-up attempts in order to start the motor.

Although it would be possible to provide additional sensors, supplying data about the precise position of the rotor, such a solution is associated with additional costs for such sensors.

The publication DE 698 03 885 T2 discloses a control device for electrical motors whereby a control unit issues to the switching facilities a switching rate and switching duration which are defined in such a way that the value of the voltage which is actually applied across the windings is that which corresponds to the rotational speed and the torque which is required of the electric motor, irrespective of the switching state of the switching facilities.

The publication DE 40 09 258 C2 discloses a method and an electronic regulating circuit for starting up a brushless DC motor.

The publication DE 600 25 909 T2 discloses a starting system for an electric motor, which can be attached in the inside of the housing of a hermetically sealed cooling compressor.

Publication DE 102 15428 A1 discloses a method for determining the position of a rotor in a synchronous motor. In this case, "by means of a brake, the rotor of the synchronous motor" is first blocked, or it is held by high static friction. Then, with the brake applied, a plurality of current vectors with different displacement angles is applied to the synchronous motor. The displacement of the rotor can be attributed to the elasticity of the shaft with which the rotor and the brake engage, or the retention force of the brake can be regarded as a spring force for very small displacements.

The publication U.S. Pat. No. 4,565,957 discloses a method and a system for starting a commutated SCR inverter. In this, the rotor is turned to a first position by the production of magnetic fields; it then turned to a second position, where the rotor is completely halted in each of said positions. According to U.S. Pat. No. 4,565,957, the motor can drive a compressor with a large capacity, for an industrial air-conditioning system.

BRIEF SUMMARY OF THE INVENTION

It is thus the objective of the present invention to provide a method and a device for starting-up an electric motor with phase windings and a rotor, with which to enable a reliable start-up of the electric motor even without any knowledge of the starting position of the rotor.

In accordance with one embodiment, a method for starting-up an electric motor, in particular a brushless DC motor which has phase windings and a rotor, incorporates the following steps:

drive the rotor in a first direction of rotation with a first torque, where the maximum value of the first torque is not greater than the maximum countertorque which opposes the rotation of the rotor, so that the rotor comes to a standstill in a first stationary position;

starting from the first stationary position, drive the rotor in a second direction of rotation which is opposite to the first direction of rotation until the rotor comes to a standstill in a predefined second stationary position; and starting from the second stationary position, start up the rotor in the first direction of rotation.

Using this method the rotor can first be driven, even from an unknown starting position, to a defined position, so that it can be run up from there with an optimal run-up profile.

The electric motor can be, in particular, a brushless DC motor which has phase windings, where the rotor is driven by applying excitation currents to the phase windings.

The rotor can be driven by a pulse width modulated signal, in particular by a pulse width modulated current signal. In this case, the duty cycle and/or the clock cycle of the pulse width modulated signal can be chosen such that the maximum value of the first torque is not greater than the maximum countertorque.

Before the first and/or the second stationary position is reached, the electric motor can be driven in stepping mode. By this means, the electric motor can be driven to the first and/or the second stationary position in a controlled way.

The second stationary position can lie within an angular range of from 0° to 90°, preferably 30° to 60°, even more preferably 35° to 45°, behind the position which corresponds to the maximum countertorque. This makes it possible to ensure a long run-up angle before the maximum countertorque arises.

During the start-up of the motor, starting from the second stationary position, an increasing second torque can be produced. By this means, the torque can be successively raised up to a torque which is sufficiently high to overcome the maximum countertorque. Here, the second torque can rise linearly in steps. As an alternative to this however, it is also possible that the rise in the second torque becomes steeper over time. This enables the progress of the second torque which is generated to be matched to the load profile of the countertorque.

The torque can follow a start ramp, at the end of which a switch is made into the auto-commutation mode, whereby the countertorque at the end of the start ramp can be less than half, preferably less than one third, of the maximum countertorque. It is thereby possible to switch into the auto-commutation mode well before the maximum countertorque.

The electric motor can initially be operated in current mode and then, when it reaches a certain rotational speed, can be switched over into the voltage mode. If the motor is operated in the current mode during the start-up phase, it is possible to ensure an ideal adjustment of the torque during the start phase. After running up, that is for example when a particular rotational speed has been reached, the motor can then be switched over into voltage mode in order to make use of the property of a synchronous motor, to eliminate the torque fluctuations in operation by means of the displacement angle.

Before driving the rotor with the first torque, the rotor can be held in a rest position for a certain period of time. Such a hold time makes it possible to wait for the pressure conditions in a compressor to normalize.

The electric motor can be used, for example, as the drive for a compressor, in particular in a cooling device, where the maximum countertorque corresponds to the countertorque at the compression point. The term cooling device is to be understood, in particular, as a domestic cooling device, that is a cooling device which is used for domestic management purposes in households or possibly also in the catering field, and in particular is used to store foodstuffs and/or beverages in normal domestic quantities at particular temperatures, such as for example a refrigerator, a freezer, a fridge/freezer combination, a chest freezer or a wine storage cabinet.

It is possible that the electric motor is driven by the application of control signals, whereby the control signals in a first start-up attempt are determined by reference to parameters for a state with a first maximum countertorque, and in a second start-up attempt which follows on from the first start-up attempt the control signals are determined by reference to parameters for a state with a second maximum countertorque, where the second maximum countertorque is greater than the first maximum torque. Thus in the first start-up attempt the parameters for a pressure-free operation can be used and in the second start-up attempt the parameters for a start-up against pressure.

A method for starting-up an electric motor having a rotor has the following steps:
produce a torque which moves the rotor in a first direction of rotation, in order to start up the electric motor;
if the start-up of the electric motor was unsuccessful, carry out the method described above.

In this way, an adaptive start-up method can be realized.

Also provided is a device, for starting-up an electric motor, which is equipped to carry out one of the methods described above.

BRIEF DESCRIPTION OF THE DRAWINGS

Further features and advantages of the invention will be apparent from the following description of exemplary embodiments, which refers to the attached figures. These show.

DETAILED DESCRIPTION OF EXEMPLARY EMBODIMENTS OF THE PRESENT INVENTION

Except as otherwise stated, reference characters which are the same in the figures refer to elements which are the same or functionally equivalent.

Figure 1:
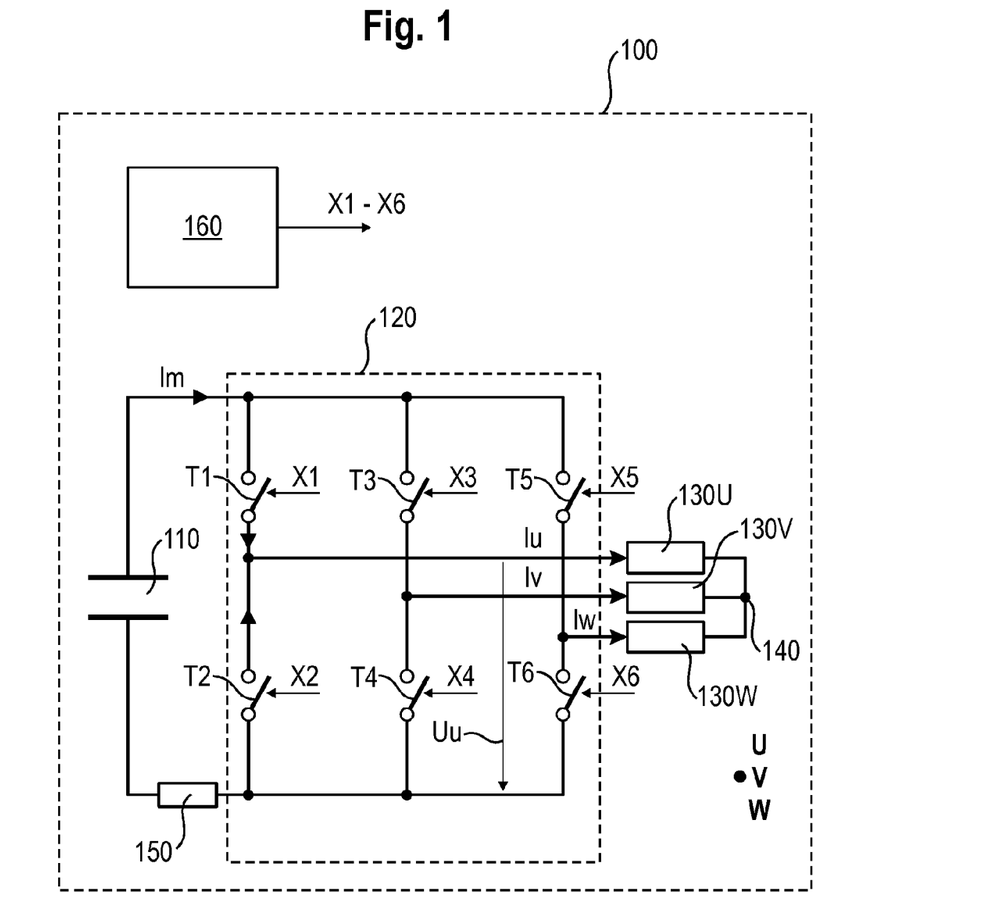
FIG. 1 an equivalent circuit diagram for an electric motor which is in the form of a brushless direct current motor or BLDC motor, FIG. 2 a graph which shows in schematic form the signal levels of the motor current and the back EMF, together with the switching states of the switches, FIG. 3 a diagram which illustrates operation in the current mode and operation in the voltage mode, where the current mode is shown in the left-hand half of the diagram, and the voltage mode in the right-hand half, FIG. 4 various compressor load profiles for an electric motor, and FIG. 5 the three steps or phases in a method according to the invention.

FIG. 1 shows an equivalent circuit diagram for an electric motor 100 which is in the form of a brushless DC motor or BLDC motor and is used, for example, as the compressor drive in a refrigerator. The electric motor 100 has a voltage supply 110, a bridge inverter 120, three motor windings or phase windings 130U, 130V, 130W and a motor controller 160.

The voltage supply 110 provides an intermediate circuit voltage between an intermediate circuit supply potential and an intermediate circuit ground. The bridge inverter 120 has six switches, T1 to T6, which are arranged in the form of a B6 bridge and supply the phase windings 130U, 130V and 130W with current. More precisely, in each case two switches—T1 and T2, T3 and T4 or T5 and T6—are connected in series between the intermediate circuit supply potential and the intermediate circuit ground. The nodes, between the switches T1 and T2, T3 and T4 or T5 and T6, are each connected to one end of a phase winding 130U, 130V and 130W. At their other ends, the phase windings 130U, 130V and 130W are connected to a star point 140. In addition, a resistance 150 is provided between the bridge inverter 120 and the voltage supply 110 on the intermediate circuit ground side.

The switches T1 to T6 can, for example, each incorporate a power transistor and a freewheeling diode connected in parallel with it. The switches T1 to T6 are actuated by means of control signals X1 to X6, which are supplied by a motor controller 160. Here, the motor controller 160 corresponds to a facility for starting up the electric motor. In doing so, the phase windings 130 are actuated in such a way as to produce a rotating magnetic field in which a rotor, which incorporates a permanent magnet, rotates. The electric motor 100 is thus a three-phase permanent magnet synchronous motor which is fed with a three-phase voltage by means of the B6 bridge inverter 120.

Figure 2:
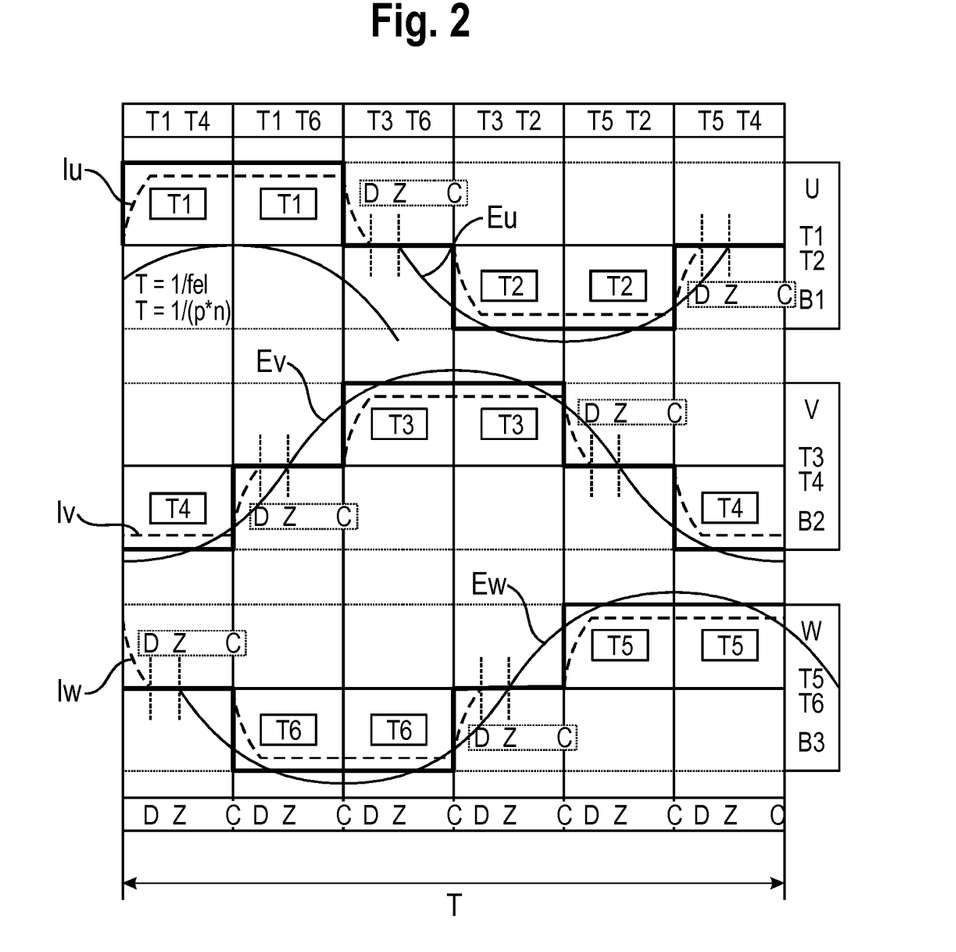

FIG. 2 is a diagram which shows schematically the signal levels of the motor current and the back EMF, together with the switching states of the switches T1 to T6. Here, the thick continuous lines represent the switching states of the switches T1 to T6, the dashed lines represent the winding currents or the excitation currents Iu, Iv and Iw through the phase windings 130U, 130V and 130W, and the thin continuous lines represent the back EMFs Eu, Ev, Ew, which are produced in the phase windings 130U, 130V and 130W. The diagram in FIG. 2 here shows the levels during one electrical period T, which is in turn subdivided into six sub-periods with a length of T/6, each of which corresponds to a 60° section. The three phase windings 130U, 130V and 130W are each actuated with an offset of 120°. During the first sub-period, the switches T1 and T4 are switched on, or to be conducting, and all the remaining switches are switched off, or to be non-conducting, so that the motor current Im flows through the phase winding 130U, via the star point 140 and through the phase winding 130V to the intermediate circuit ground. At the end of this first sub-period, commutation takes place from the phase winding 130V over to the phase winding 130W, in that the switch T4 is switched off and switch T6 is switched on. During this second sub-period, the switches T1 and T6 are switched on, so that the motor current Im flows through the phase winding 130U, via the star point 140 and through the phase winding 130W to the intermediate circuit ground. At the end of this second sub-period, a second commutation takes place, from the phase winding 130U over to the phase winding 130V, in that the switch T1 is switched off and switch T3 is switched on. During this third sub-period, the switches T3 and T6 are switched on, so that the motor current Im flows through the phase winding 130V via the star point 140 and through the phase winding 130W to the intermediate circuit ground. In accordance with this pattern, there are thus always two of the phase windings 130 which are conducting a current and the third phase winding 130 is free of current. So each of the individual phase windings 130 is connected in turn for 2×60°=120° to the intermediate circuit supply potential, and is then switched to be free of current for 60°, then connected for 2×60°=120° to the intermediate circuit ground and is then again free of current for 60°.

Thus for each electrical period T, six switching states are actuated, where the electrical period T is given by a. $T=1/(p \times n)$ (1)

where n is the rotational speed of the motor and p is the number of its pole pairs.

The motor controller 160 adjusts the time point for the commutation in such a way that the movement of the rotor and the phase times of the applied voltages are synchronous and in phase. In doing so, the position of the rotor is deduced from the back EMFs of the motor, that is the voltages induced in the phase windings 130 of the stator by the magnetic field of the rotor. A characterizing variable for this is the point of passage through zero of the back EMF, each of which is labeled "Z" in FIG. 2. The commutation can, for example, be triggered with a predefined time delay after the passage through zero is detected, where said length of this time can be dependent on the rotational speed and/or the load. In FIG. 2, each of the points in time when commutation takes place is labeled "C". It can further be seen in FIG. 2 that the winding current has an inertia which is caused by the inductance of the winding coil. Thus, when the switch T1 is switched on, the current Iu through the phase winding 130U increases over a certain rise time, and when the switch T1 is switched on the current Iu decays to zero over a period of time which corresponds to the time to demagnetize the phase winding 130U. The winding current does not decay to zero until the time point "D". Commutation is then characterized by the three events D, Z and C, that is the time point D of the demagnetization of the previously current-carrying phase, the time point Z when the passage through zero is recognized and the time point C of the active triggering of commutation, after a predefined time.

Figure 3:
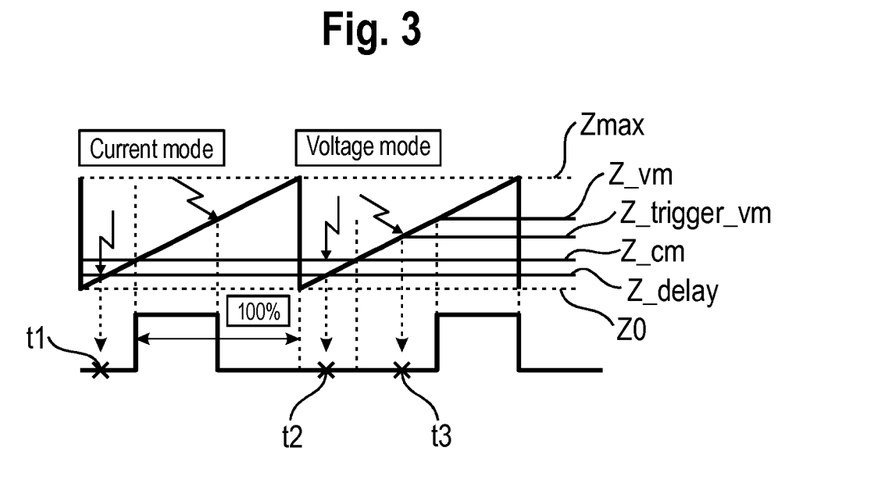

Regulation of the energy feed to the motor windings is effected by means of pulse width modulation, PWM. Here, the "duty cycle" is used as a measure of the relative switch-on time of the PW modulated terminal voltage. The duty cycle is the ratio of the switch-on time to the cycle time, and thus has a value between 0% and 100%. PWM for the purpose of actuating the electric motor 100 can be effected in the current mode or in the current mode or in the voltage mode. FIG. 3 shows a diagram illustrating both methods, where the current mode is shown in the left-hand half of the diagram, and the voltage mode in the right-hand half.

Common to both methods is that in the motor controller 160, for example, a counter (not shown in more detail) generates reference values or count values, as applicable, which are incremented from an initial value Z0 up to a maximum value Zmax, so that when looked at over time a triangular pattern or triangular shaped graph results.

In the current mode, the motor current is set by means of a comparator circuit, using the two point method. When the count value of the counter reaches the comparison value Z_cm, then the pulse width modulated voltage is switched on. In current mode, the duty cycle is determined by the point in time when the actuation circuit switches off the PWM pulse. More precisely stated, the set-point current and the instantaneous actual current can, for example, be fed to a current comparator. When the actual current reaches the set-point current, then the pulse width modulated voltage is switched off.

In the voltage mode, on the other hand, the motor controller 160 calculates a set-point voltage, and the relative switch-on duration of the PWM is input. This can be effected, for example, by the motor controller 160 determining a comparison value Z_vm and comparing it with the current count value, whereby the PWM voltage is switched on if the count value Z is greater than or equal to Z_vm and is less than or equal to Zmax. The count values Z_delay and Z_trigger_vm indicate possible time points t1, t2 and t3 for a measurement of the back EMF.

In other words, in the current mode it is the torque which is input, in voltage mode it is the rotational speed. The operating mode is chosen as a function of the load characteristics and the requirements to be met by the electric motor 100. Depending on whether it is high constancy of rotational speed that is desired, or low noise development or vibrations, or energy efficiency, the appropriate operating mode will be selected. Here, the operating mode can be determined when the electric motor 100 is switched on, or can even be switched over depending on the operating conditions. A mixture of the operating modes is also possible. It is advantageous to operate the motor in the current mode during the start-up phase, in order to ensure optimal adjustment of the torque during the start phase. After run-up, that is for example when a particular rotational speed has been reached, the motor can then be switched over into the voltage mode, in order to utilize the characteristic of a synchronous motor, of using the displacement angle to eliminate fluctuations in torque during operation.

The electric motor 100 can, for example, be used as the drive for a compressor in a refrigerator. Such a compressor compresses a coolant by means of a piston compressor. With this, the coolant is admitted into a piston chamber through an inlet valve in a valve plate, is compressed by a piston driven by an electric motor, and is driven out of the piston chamber through an outlet valve in the valve plate. Hence, once in each rotation the piston reaches top dead center, and with it the point of maximum compression, at which the greatest countertorque opposes the motor. The load profile of the load which is driven by the motor is thus very dynamic, with the maximum torque being a multiple, e.g. five times, over the mean torque.

Figure 4:
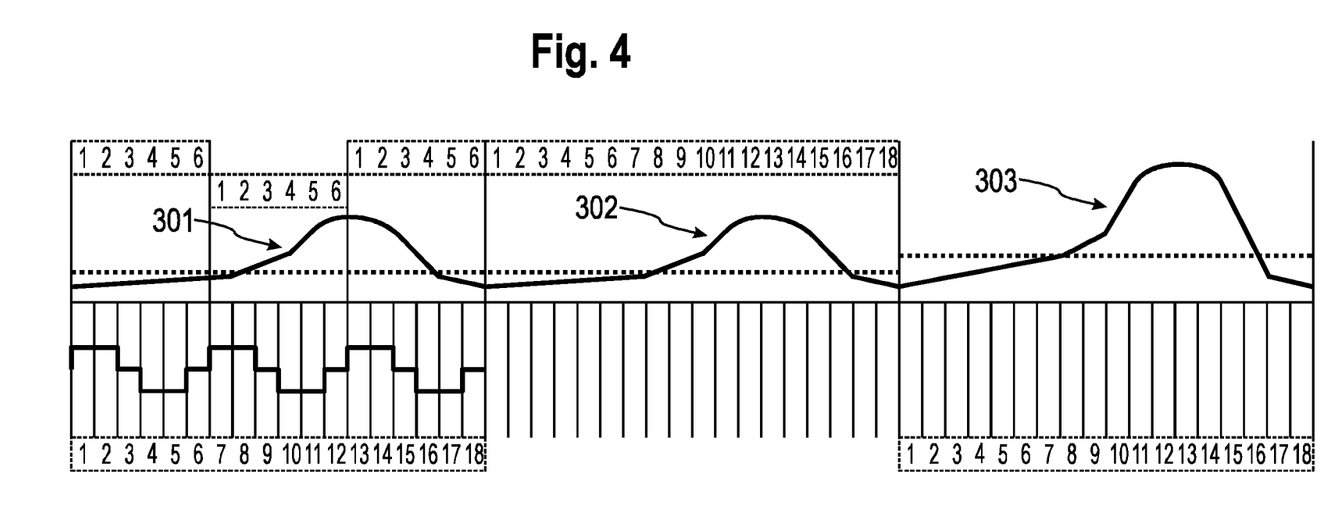

FIG. 4 shows various compressor load profiles 301, 302 and 303 for such an electric motor 100. As can be seen in FIG.

4, one rotation of the 6-pole electric motor 100 corresponds to three electrical periods T, that is one electrical period T per pole pair. Each of these electrical periods T corresponds to 6 electrical positions or switch settings, as indicated for load profile 301. There are thus a total of 18 electrical sub-periods, as indicated for the load profile 302. In the lower half of FIG. 4, the characteristic BLDC control signal for a phase winding is indicated schematically. The counter-pressure caused by the coolant depends on the operating state of the cooling circuit. Depending on how much of the coolant has been liquefied and how much is still in the gaseous form, the maximum countertorque will be higher or lower. If the compressor is put back into operation after being stationary for a longer time, then the pressure in the piston chamber is lower, so that the maximum countertorque is smaller. This corresponds to the load profiles 301 and 302. On the other hand, if the compressor starts up after a short load time, this will take place against a higher residual pressure. This corresponds to the load profile 303.

As explained in the introduction, the rotor of the BLDC motor 100 can be positioned by a defined setting of the switches. However, since the BLDC motor 100 has three pole pairs, each of the six possible electrical positions 1 to 6 is associated with exactly three rotor positions. Which of these three rotor positions the rotor is positioned at depends on the position in which the rotor came to a standstill after its preceding rotation. This position is not known. If the rotor is now initially positioned to a position which is not sufficiently far from the maximum load, e.g. in position 2 of the second electrical period in the load profile 301, then the torque produced by the start-up ramp may be insufficient to overcome the countertorque working on the motor, and the start-up will fail.

With the method described below, the rotor is initially driven to a precisely defined position before the run-up in the direction of rotation is effected. In other words, the ambiguity of the rotor positions is first resolved. The idea underlying the method is first to turn the rotor, with a low torque, in a first direction of rotation so that it stalls in a first stationary position before the maximum countertorque. Following this, the rotor is turned through a certain angle of rotation in the opposite direction as far as a second stationary position, and is positioned there. Finally, the motor is run up in the first direction with a run-up ramp. The individual steps are explained in more detail below.

Figure 5:
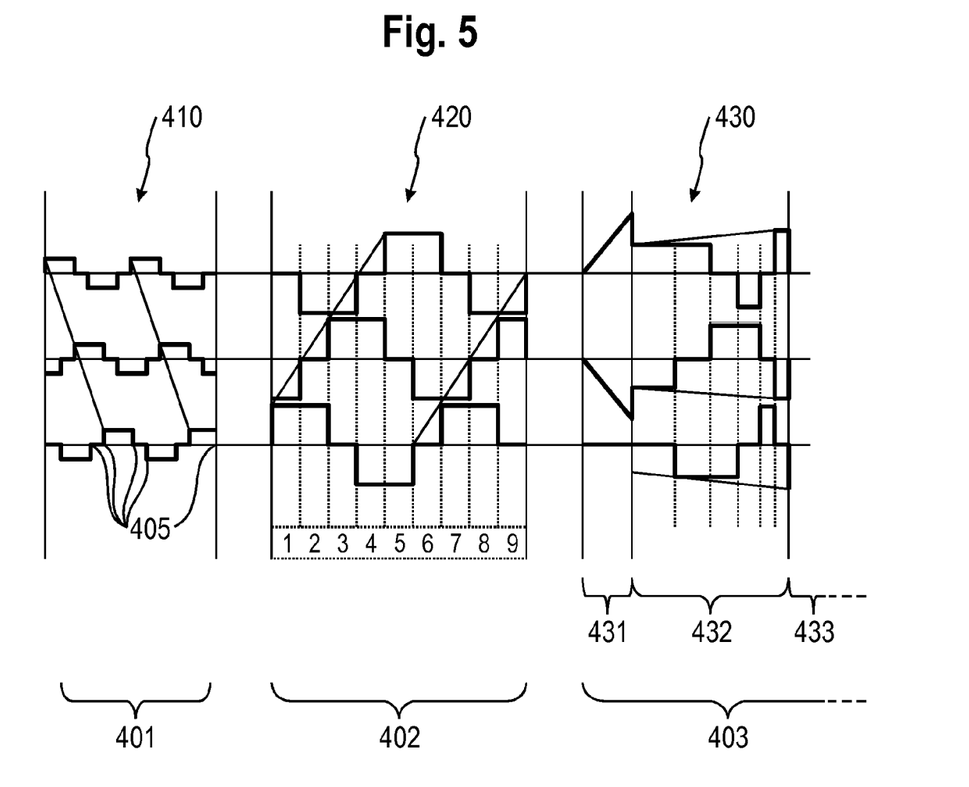

FIG. 5 illustrates the three steps or phases 401, 402 and 403 of this method and shows in schematic form the excitation currents 410, 420 and 430 which flow through the phase windings 130 in the individual phases. In a first step 401, the rotor is driven in a first direction which is identical with the later final direction of rotation of the rotor. In doing this, the phase windings are subject to an excitation current which produces a first torque which is smaller than the maximum countertorque which opposes the turning of the rotor. The term maximum countertorque is to be understood as the torque at the point in time of the greatest load during a complete rotation of the motor, that is at the compression point. In this phase, the rotor can be rotated in stepping mode. This means that with each commutation the rotor moves in the direction of rotation and then, after the rotor's permanent magnet has aligned itself with the changed magnetic field it comes to a standstill, before another commutation takes place. Each commutation here corresponds to a step or an electrical sub-period. The individual steps 405 are also referred to as "latching steps". For the purpose of producing the magnetic field, in each case two of the three phase windings 130U, 130V and 130W have current flowing through them. Their actuation is here effected using pulse width modulation (PWM), in which each of the switches T1 to T6 is switched on in each PWM cycle for a time corresponding to the duty cycle. Here, the first torque which is produced is not necessarily constant over time. In particular, in stepping mode the torque can follow a defined profile. It is only important that the maximum value of the first torque lies below the maximum countertorque.

It is possible, by appropriate adjustment of the duty cycle of the PWM and the duration of the individual steps 405, to ensure that the torque produced in each step 405 of this first phase 401 is less than the maximum countertorque. Actuation parameters which correspond to the maximum countertorque in freewheeling operation, that is when the pressure in the piston chamber is a minimum, can be stored away in a store in the motor controller 160 and referred to in this first phase 401, by which means it is possible to ensure an adequately low torque. Since the rotor cannot overcome the maximum countertorque, it stalls in a first stationary position before the compression point. This first stationary position then lies a few steps, e.g. two to four steps, before the compression point. It is therefore sufficient if the number of steps in this phase 401 corresponds to the number of electrical substeps per revolution, because the rotor will then stall in the same position regardless of the starting position. However, it does not of course do any harm if a larger number of latching steps 405 is carried out. Furthermore, it is also sufficient to make a smaller number of latching steps 405. On the assumption that in its starting position the rotor is located at least two steps behind the compression point and comes to a standstill, or stalls, at least two steps before the compression point, it is sufficient in the present example to make 14 latching steps 405.

In the next phase 402 of the method, the rotor is moved, starting from the first stationary position, by a defined number of steps in a second rotational direction which is opposite to the first direction of rotation. The objective of this phase 402 is to bring the rotor to a defined stationary position which, in the direction of rotation, is as far as possible from the compression point, so that in the subsequent phase the longest possible start-up ramp can be provided. The positioning of the rotor in the direction opposite to the later one can here again be effected in stepping mode, in doing which it is not important whether the torques produced are greater than or less than the maximum countertorque. Assuming the most unfavorable situation, that the first stationary position at the end of the stepping mode of phase 401 lies 4 steps before the compression point, the rotor can then be turned through 12 steps against the direction of rotation, and then comes to a standstill in the second stationary position, two steps behind the compression point. It should be noted that, for the sake of simplicity, only nine steps are shown in FIG. 5. Here, it is possible to start this stepping mode with a switch setting lying only two or three steps behind the compression point. These steps then correspond, if applicable, to the electrical positions which the rotor was unable to pass due to the high countertorque. So, during these steps the rotor pauses in the first stationary position, and only in the subsequent steps is to "picked up". So it is unimportant if the first stationary position, in which the rotor came to a standstill at the end of phase 401, is unknown, because after the rotor is picked up its exact position is known. At the end of phase 402, the rotor is thus in a precisely defined second stationary position.

In the third phase 403 of the method the rotor is started up, rotating in the first direction of rotation, starting from the second stationary position, whereby a torque is generated which is greater than the maximum countertorque. This third phase 403 can in turn be subdivided into three sections 431, 432 and 433.

During the first section 431, two of the phase windings 130 are subjected to an excitation current, where this excitation current follows a defined rate of rise. Since the torque is essentially proportional to the current, this also rises correspondingly, starting from zero. This ensures that oscillations of the rotor due to the sudden application of a torque do not arise. Which of the two phase windings are actuated depends on the final position of the rotor in phase 402, where the phase windings are actuated in such a way that the rotor moves in the opposite direction compared to phase 402, that is in the finally-desired rotational direction.

In the second section 432, the phase windings are actuated in accordance with an actuation profile which corresponds to a predefined starting ramp. The parameters, such as for example the set current, the time points of the commutations and suchlike, are in this case predefined and can, for example, be stored away in a store in the motor controller 160. In particular the time points of the commutations are here not yet based on the back EMF but are defined in advance.

In the third section 433, commutation is then effected as a function of the back EMF which is determined, for example in each case a certain length of time after the passage through zero of the back EMF determined, in the manner described above. This mode is also referred to as "auto-commutation", and corresponds to the diagram in FIG. 2.

The number of steps, in the run-up ramp in the second section 432, before switching over to auto-commutation, should be selected so that the auto-commutation is reached a few steps, e.g. three to seven steps, before the compression point. If, for example, the end position in the second phase 402 lies sixteen steps before the compression point, and the countertorque rises sharply after the twelfth step, then a start ramp with ten steps before the switchover to auto-commutation is ideal.

In one embodiment, the torque produced by the start ramp in the second section 432 of the third phase 403 rises linearly in steps, which here means that the difference between the torques or excitation currents generated in any two consecutive switch states is essentially constant. In this case, the torque produced is of course always greater than or is equal to the countertorque which opposes the motor, and which results from inertial forces, frictional forces and compression forces. However, in an alternative embodiment the torque produced by the start ramp may also rise non-linearly. In particular, it can be matched to the expected countertorque, so that the motor initially runs up gently and the torque produced is then raised more than proportionally, corresponding to the steep rise in the countertorque. This can be achieved by referring to the appropriate actuation parameters, which may have been stored, such as for example for the duty cycle.

At the end of the second section 432, a switchover is then made to auto-commutation. The torque produced in the third section 433 is greater than the countertorque at the compression point, so that this time the rotor does not remain stationary, but gets past the compression point and runs up.

As already explained above, the load profile depends on, among other things, the time for which the compressor had not been switched on. During its start-up, the compressor's motor must therefore run up subject to different load profiles, which are not always known. This is taken into consideration in the adaptive run-up of the motor, described below.

In the case of an adaptive run-up, several run-up attempts of different types are made. A first type of run-up is the start-up method described above, with its three phases as described. A second type of run-up is a simple BLDC run-up corresponding, for example, to the third phase 403 described above, without the performance of phases 401 and 402. A third type of run-up is a fresh run-up, after a predefined hold time which is intended to ensure that the pressure conditions in the piston chamber relax and the maximum countertorque sinks. A fourth type of run-up is a run-up with a changed set of parameters.

The types of run-up cited can be combined with each other in any arbitrary way. For example, it is possible to start by carrying out a simple BLDC run-up, and if this is unsuccessful to carry out the start-up method described above with the three phases as described. It is possible to determine that a run-up attempt has been unsuccessful by, for example, an inability to determine a passage through zero for the back EMF, i.e. even after a predefined, relatively long time the back EMF still has no passage through zero.

One example of a somewhat more extensive adaptive method is as follows: In a first step, there is a wait for a predefined hold time. In a second step, a simple BLDC run-up is carried out using a parameter set for a pressure-free run-up, that is a parameter set which is based on an expected load profile for low counter-pressure. If this run-up fails, the entire run-up sequence with its phases 401, 402 and 403 is carried out, once again with a parameter set for a pressure-free run-up. If this run-up also fails, the BLDC run-up is first carried out with amended parameters, and then the entire run-up sequence with amended parameters. These amended parameters will be based on an expected load profile for high counter-pressure. If even these attempts are unsuccessful, then there can be another wait for the hold time, and the sequence then carried out anew, if necessary with parameters which have again been amended, or a longer hold time.

It is of course also possible to carry out first a series of BLDC run-ups with different parameter sets, followed by a series of run-up sequences with the phases 401, 402 and 403, with different parameter sets, where each run-up attempt can be preceded by a hold time.

Examples of possible parameters, which can be varied between the start-up sequences, are: the starting position of the rotor at the beginning of the BLDC run-up, the duration of the current flow in the starting position, the duty cycle and the change in the duty cycle during the rotor alignment phase, i.e. during section 431, the start ramp in section 432, in particular the time points of the individual commutations during this section, the shape of the graph for this start ramp, the number of steps prior to auto-commutation or up to the measurement of the back EMF, the number of EMF passages through zero which are detected before the change to auto-commutation, the mode of operation and the duty cycle in the ramp or the change in the duty cycle with the rotational speed, the initial values for the demagnetization time and the first commutation time at the point of switchover. Other possible parameters are the times up to the activation of the rotational speed regulator, up to any change in the mode of operation, and up to the use of factors dependent on the rotational speed, as well as all the calculation parameters used in operation for determining the commutation time point.

With such an adaptive run-up, the motor can be reliably started up even when the load characteristics are unknown.

List of Reference Characters

100 Electric motor
110 Voltage supply
120 Bridge inverter
130U, 130V, 130W Phase winding 140 Star point
150 Resistance
160 Motor controller
301, 302, 303 Load profiles
401, 402, 403 Phases
405 Latching steps
410, 420, 430 Excitation currents
Iu, Iv, Iw Winding currents
Uu, Uv, Uw Terminal voltages
T Electrical period
Tm1, Tm2 Measurement windows
X1 . . . X6 Control signals
Z0, Z_cm, Z_delay, Z_trigger_vm, Z_vm, Z_max Count values

The invention claimed is:

1. A method for starting up an electric motor, which has a rotor, comprising the steps of:
driving the rotor in a first direction of rotation with a first torque, wherein a maximum value of the first torque is not greater than a maximum counter torque opposing the rotation of the rotor, causing the rotor to come to a standstill in a first stationary position;
starting from the first stationary position, driving the rotor in a second direction of rotation, which is opposite from the first direction of rotation, until the rotor comes to standstill in a predefined second stationary position; and
starting from the second stationary position, starting up the rotor in the first direction of rotation.

2. The method as claimed in claim 1, wherein the electric motor comprises phase windings and the rotor is driven by applying excitation currents to the phase windings.

3. The method as claimed in claim 1, wherein the rotor is driven by a pulse width modulated signal.

4. The method as claimed in claim 3, wherein the pulse width modulated signal is a pulse width modulated current signal.

5. The method as claimed in claim 3, wherein at least one of a duty cycle and a clock cycle of the pulse width modulated signal is selected such that the maximum value of the first torque is not greater than the maximum counter torque.

6. The method as claimed in claim 1, wherein the electric motor is driven in a stepping mode before reaching the predefined first or second stationary position.

7. The method as claimed in claim 1, wherein the second stationary position is located within an angular range from 0° to 90° behind the position which corresponds to the maximum counter torque.

8. The method as claimed in claim 1, wherein the second stationary position is located within an angular range from 30° to 60° behind the position which corresponds to the maximum counter torque.

9. The method as claimed in claim 1, wherein the second stationary position is located within an angular range from 35° to 45° behind the position which corresponds to the maximum counter torque.

10. The method as claimed in claim 1, further comprising producing an increasing second torque when the motor is started from the predefined second stationary position.

11. The method as claimed in claim 10, wherein the second torque increases linearly in steps.

12. The method as claimed in claim 10, wherein the second torque increases over time with an increasing slope.

13. The method as claimed in claim 10, wherein the second torque follows a start ramp and switches into an auto-commutation mode at an end of the start ramp, wherein at the end of the start ramp the counter torque is less than half of the maximum counter torque.

14. The method as claimed in claim 13, wherein at the end of the start ramp the counter torque is less than one third of the maximum counter torque.

15. The method as claimed in claim 1, wherein the electric motor is initially started up in current mode and switches over into voltage mode when reaching a predetermined rotational speed.

16. The method as claimed in claim 1, further comprising holding the rotor in a rest position for a predetermined period of time before driving the rotor with the first torque.

17. The method as claimed in claim 1, wherein the electric motor is employed to drive a compressor, in particular a compressor in a refrigerator, wherein the maximum counter torque corresponds to a counter torque at a compression point.

18. The method as claimed in claim 1, further comprising:
applying control signals to the electric motor to drive the electric motor,
determining the control signals in a first start-up attempt by reference to parameters for a state with a first maximum counter torque, and
determining the control signals in a second start-up attempt, which follows the first run-up attempt, by reference to parameters for a state with a second maximum counter torque, wherein the second maximum counter torque is greater than the first maximum counter torque.

19. A method for starting up an electric motor, which has phase windings and a rotor, comprising the steps of:
producing a torque which moves the rotor in a first direction of rotation, in order to start up the electric motor;
when the start-up of the electric motor is unsuccessful
driving the rotor in a first direction of rotation with a first torque, wherein a maximum value of the first torque is not greater than a maximum counter torque opposing the rotation of the rotor, causing the rotor to come to a standstill in a first stationary position;
starting from the first stationary position, driving the rotor in a second direction of rotation, which is opposite from the first direction of rotation, until the rotor comes to standstill in a predefined second stationary position; and
starting from the second stationary position, starting up the rotor in the first direction of rotation.

20. A device for starting up an electric motor with a rotor designed as the drive for a compressor having a compression point, in particular a compressor in a refrigerator, wherein the device is configured
to drive the rotor in a first direction of rotation with a first torque, wherein a maximum value of the first torque is not greater than a maximum counter torque opposing the rotation of the rotor, causing the rotor to come to a standstill in a first stationary position;
starting from the first stationary position, to drive the rotor in a second direction of rotation, which is opposite from the first direction of rotation, until the rotor comes to standstill in a predefined second stationary position; and
starting from the second stationary position, to start up the rotor in the first direction of rotation;
wherein the maximum counter torque corresponds to a counter torque at the compression point.

21. An electric motor with a rotor designed as the drive for a compressor having a compression point, in particular a compressor in a refrigerator, the electric motor comprising a device for starting up the electric motor wherein the device is configured
to drive the rotor in a first direction of rotation with a first torque, wherein a maximum value of the first torque is not greater than a maximum counter torque opposing the rotation of the rotor, causing the rotor to come to a standstill in a first stationary position;

starting from the first stationary position, to drive the rotor in a second direction of rotation, which is opposite from the first direction of rotation, until the rotor comes to standstill in a predefined second stationary position; and starting from the second stationary position, to start up the rotor in the first direction of rotation;

wherein the maximum counter torque corresponds to a counter torque at the compression point.

* * * * *